Aug. 5, 1924.

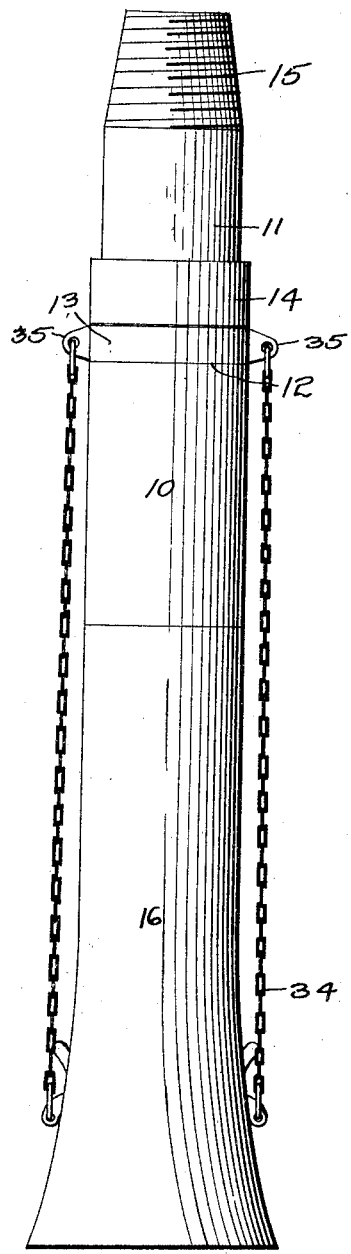
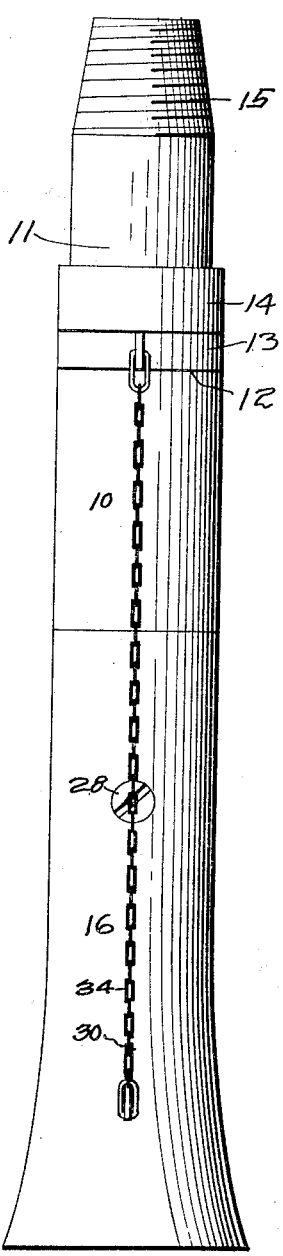
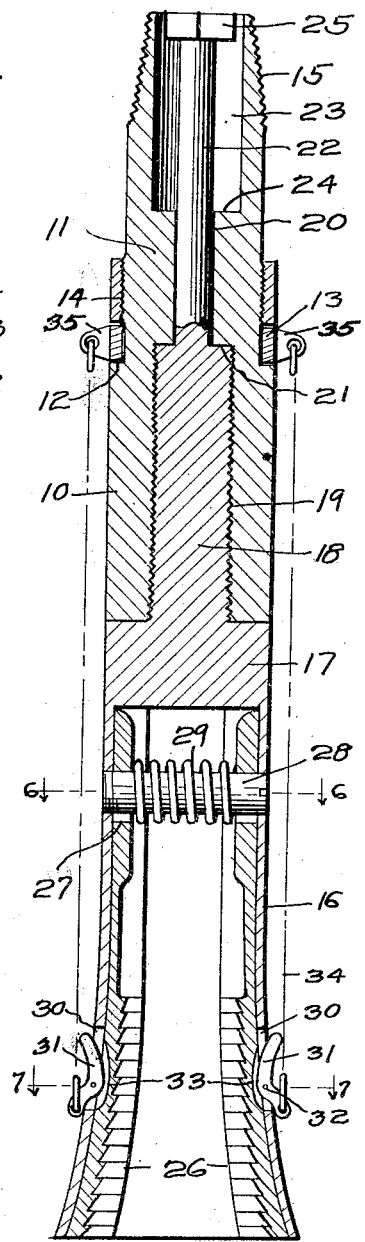

P. STROM ET AL 1,503,724

FISHING TOOL

Filed Nov. 3, 1923

Inventors
Vick Ganieany AND
Peder Strom,
By
Attorney

Patented Aug. 5, 1924.

1,503,724

UNITED STATES PATENT OFFICE.

PEDER STROM, OF CHICAGO, AND VICK L. GANIEANY, OF BLUFORD, ILLINOIS.

FISHING TOOL.

Application filed November 3, 1923. Serial No. 672,644.

*To all whom it may concern:*

Be it known that PEDER STROM and VICK L. GANIEANY, citizens of the United States, residing at Chicago and Bluford, respectively, in the counties of Cook and Jefferson, respectively, and State of Illinois, have invented certain new and useful Improvements in Fishing Tools, of which the following is a specification.

Our invention relates to improvements in fishing tools for wells, such as oil wells or the like.

An important object of the invention is to provide a tool of the above mentioned character, which may be successfully employed in moving various objects from the casing of a well, such as a deep well.

A further object of the invention is to provide reliable and powerful means for effecting the clamping action of the jaws of the device.

A further object of the invention is to provide a tool of the above mentioned character, which is of simple construction, strong, and durable.

Other objects and advantages of the invention will be apparent during the course of the following description.

In the accompanying drawings, forming a part of this specification, and in which like numerals are employed to designate like parts throughout the same.

Figure 1 is a side elevation of a fishing tool embodying my invention,

Figure 2 is a similar view at a right angle to Figure 1,

Figure 3 is a central vertical longitudinal section through the fishing tool,

Figure 4:
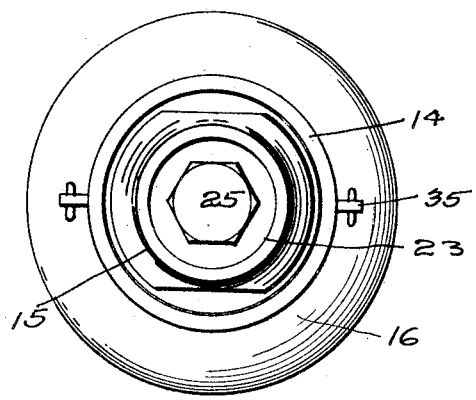
Figure 4 is a plan view of the same.
Figure 5:
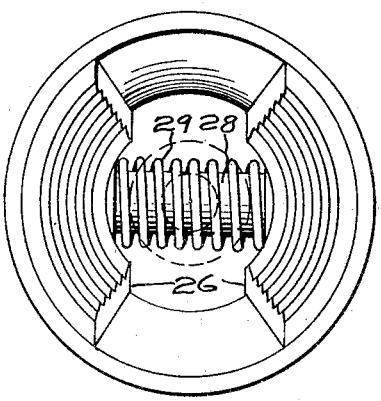
Figure 5 is a bottom plan view of the tool.
Figure 6:
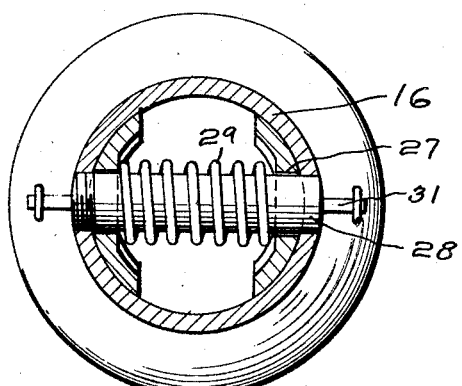
Figure 6 is a horizontal section taken on line 6—6 of Figure 3.
Figure 8:
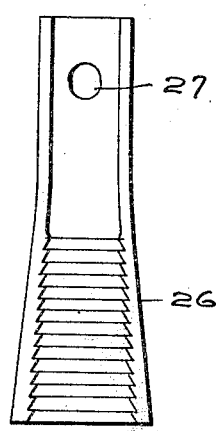
Figure 8 is a side elevation of one of the jaws.
Figure 7:
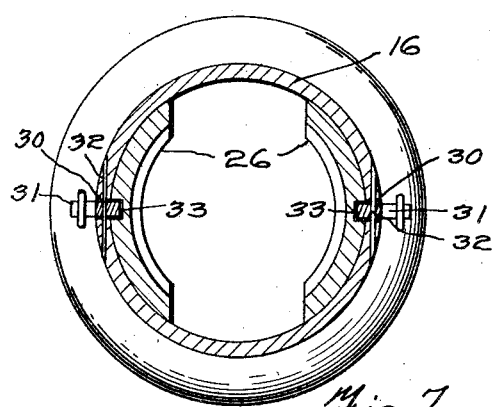
Figure 7 is a similar view taken on line 7—7 of Figure 3.

In the drawings, wherein for the purpose of illustration is shown a preferred embodiment of my invention, the numeral 10 designates an upper tubular body, which is preferably cylindrical. This tubular body is provided at its upper end with a somewhat reduced cylindrical extension 11, forming a shoulder 12. A suspension ring 13 is swiveled upon the extension 11, above the shoulder, and is retained in place by an internally screw threaded ring 14, which is screw threaded upon the extension 11, the upper portion of this extension being smooth and slightly reduced to permit of the passage of the screw threaded ring thereon. The upper end of the extension 11 is tapered and screw threaded, as indicated at 15, having connection with the usual coupling, not shown, supported by the usual cable.

The numeral 16 designates a lower tubular member, preferably circular in cross section and flaring downwardly. The tubular member 16 is provided at its upper end with a solid head 17, carrying a cylindrical shank 18, and these parts are preferably cast integral. The shank 18 is screw threaded throughout its entire length for engagement with the screw threaded wall of the bore 19 of the upper tubular body 10. The bore 19 leads into a reduced bore 20, forming a shoulder 21, and the shank 18 carries at its upper end a rod 22, preferably formed integral therewith. This rod extends through the bore 20 and leads into a larger bore 23, forming a shoulder 24. The rod 22 carries a stop element or nut 25, to contact with the shoulder or bottom 24, serving as a stop to limit the downward movement of the shank 18 with respect to the upper tubular body 10. It might be stated at this point that when the cable and consequently the upper tubular body 10 is rotated clock-wise with respect to the lower tubular body 16 being held stationary, that this lower body 16 will move downwardly longitudinally with respect to the upper tubular body 10.

Mounted within the lower tubular body 16 are jaws 26, two of which are preferably employed. These jaws are preferably transversely and longitudinally curved to conform to the curvature of the lower tubular body 16. The jaws 26 are provided near their upper ends with transverse openings 27, receiving a transverse support pin 28, which has a substantially smaller diameter than the openings 27 whereby the jaws are capable of partaking of a lateral or pivotal action upon the pin 28. A compressible coil spring 29 surrounds the pin 28 and forces the jaws 26 outwardly, as shown.

The lower portion of the lower tubular body 16 is slotted, as shown at 30, and shifting elements or cams 31 are pivoted to the body 16, within these slots, as shown at 32. These operating elements or cams are adapted to engage cam faces 33, formed upon the outer walls of the jaws 26, to shift these jaws inwardly in opposition to the spring 29. Flexible pulling elements or chains 34 are attached to the lower ends of the shifting elements or cams 31, to swing them inwardly and these flexible elements or chains extend upwardly for connection with apertured ears 35, formed upon the swiveled ring 13.

In the use of the fishing tool, it is suspended in the casing of the well by the cable, in the usual manner, and when the object to be raised is located and engaged within the jaws 26, the cable is turned in a clock-wise direction. The jaws 26 engage with the object, holding the lower tubular body 6 against turning movement while the upper tubular body is turned by action of the cable. This movement causes the lower tubular body to move downwardly with respect to the upper body 10, and the elements 34 therefore turn the cam elements upon their pivots, swinging them inwardly. These cam elements cause the jaws to clamp the object to be raised. This clamping action may be securely maintained while the tool, with the object to be raised, is being elevated from the casing.

It is to be understood that the form of our invention herewith shown and described is to be taken as a preferred example of the same, and that various changes in the shape, size, and arrangement of parts may be resorted to, without departing from the spirit of the invention, or the scope of the subjoined claims.

Having thus described our invention, what we claim is:

1. A fishing tool comprising an upper body, a lower body having screw threaded engagement with the upper body whereby there is a relative longitudinal movement between said bodies when one is turned with relation to the other, inwardly movable jaws carried by the lower body, means to move the jaws inwardly, and connecting means between the moving means and the upper body whereby the moving means is actuated upon the said relative longitudinal movement of said bodies.

2. A fishing tool comprising an upper body, a lower body having screw threaded engagement therewith, whereby there is a relative longitudinal movement between the bodies when one is turned with relation to the other, inwardly moving jaws carried by the lower body, means mounted upon the lower body for effecting the inward movement of the jaws, and pull elements connected with said means and connected with the upper body.

3. A fishing tool comprising an upper body, a lower body having screw threaded connection therewith, inwardly movable jaws carried by the lower body, pivoted cams to move the jaws inwardly, a swiveled ring mounted upon the upper body, and pull elements connecting the cams and swiveled ring.

4. A fishing tool comprising an upper tubular body, a lower tubular body provided with an upstanding shank screw threaded within the bore of the upper tubular body, jaws arranged within the lower tubular body and having openings in their upper portions, a transverse pin carried by the lower tubular body and passing through said openings, a spring mounted upon the pin and engaging the jaws, cams pivoted upon the lower body and adapted to engage the jaws to move them inwardly, and pull elements connected with the cams and with the upper body.

5. A fishing tool comprising an upper body, a lower body connected therewith, jaws carried by the lower body, and means operated upon the relative turning movement of said bodies to positively move the jaws inwardly.

In testimony whereof we affix our signatures.

PEDER STROM.
VICK L. GANIEANY.